Nov. 6, 1934.  M. SHOELD  1,980,008
MANUFACTURE OF FERTILIZERS
Filed May 7, 1932
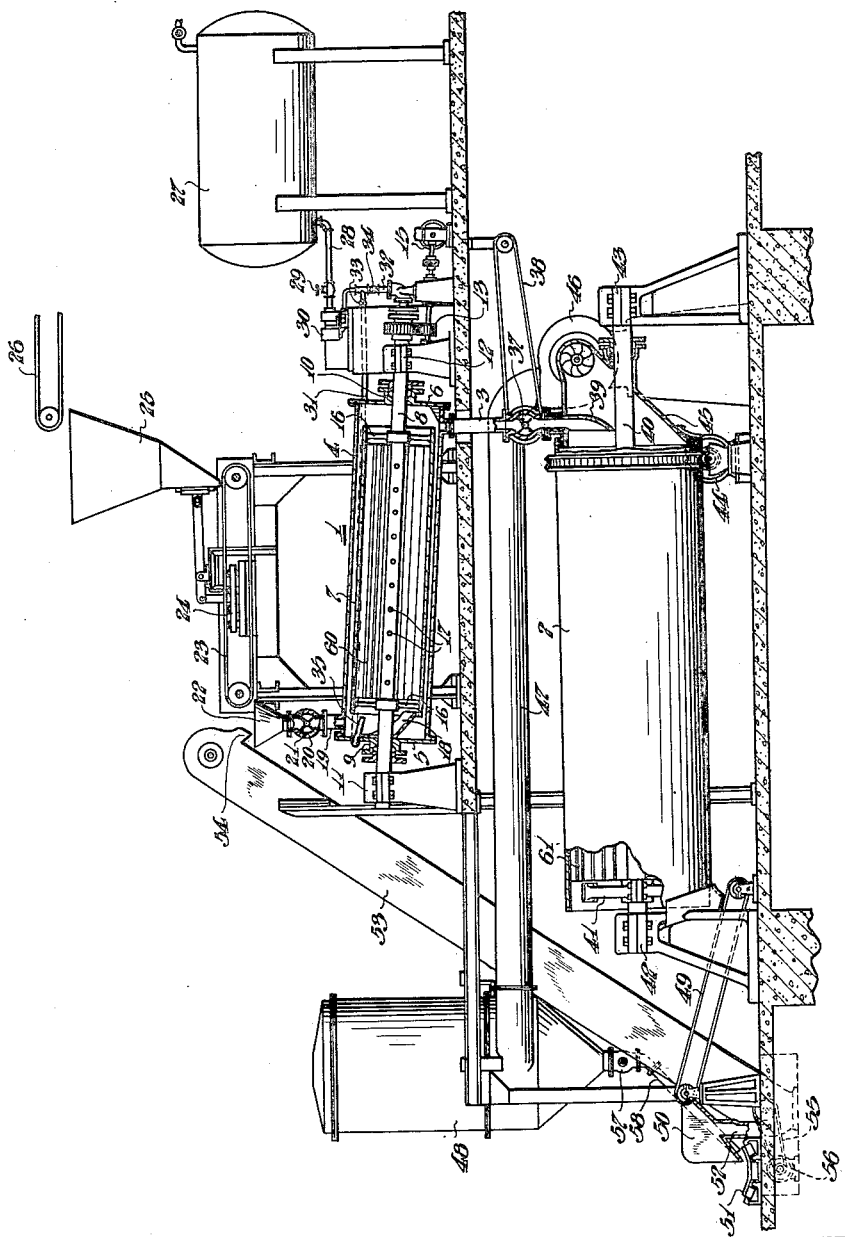
INVENTOR.
Mark Shoeld.
BY
Jesse P. Langley
ATTORNEY.

Patented Nov. 6, 1934

1,980,008

UNITED STATES PATENT OFFICE 1,980,008

MANUFACTURE OF FERTILIZERS

Mark Shoeld, Mount Lebanon Township, Allegheny County, Pa., assignor to The Koppers Company of Delaware, a corporation of Delaware Application May 7, 1932, Serial No. 609,809

7 Claims. (Cl. 71—7)

This invention relates to processes of and apparatus for the manufacture of fertilizers, and more particularly to the manufacture of ammoniated phosphate material.

Superphosphate material or material containing the same is ammoniated for several principal reasons. Ammonia neutralizes free acid in superphosphate and prevents the disintegration of the bags in which superphosphate is ordinarily shipped. Superphosphate is ammoniated to improve its physical condition, that is, to remove its stickiness and to prevent setting or caking. Furthermore, the cost of ammonia, either anhydrous or aqua ammonia, is lower than any other high grade form of fixed nitrogen that may be combined with phosphate material.

At one time, in the fertilizer industry, it was customary to use lime to improve superphosphate. The introduction of lime does not add to the fertilizer value of superphosphate and in addition to this, lime tends to revert the phosphoric acid to insoluble or unavailable forms.

Considerable quantities of anhydrous ammonia as well as ammonia liquor are used for the ammoniation of phosphate materials. Such ammonia-containing reagents are ordinarily employed in a batch operation. The usual process consists in introducing ammonia and superphosphate or double superphosphate into a horizontal rotary mixer and agitating the material. Hermetically sealed rotating cylinders are also in use for this purpose.

The amount of ammonia that may be introduced into the superphosphate is limited. If too large amounts are added there is danger of reversion of the available $P_2O_5$. I have found that amount of reversion in superphosphate is closely related to the temperature reached during the process of ammoniation and also to the amount of free moisture present. During the ammoniation of superphosphate up to, for instance, 3% ammonia in an ordinary batch-type machine, the temperature obtained is usually around 200° F. or above.

I have further found that when the ammoniated material is discharged from the ammoniator and put into the storage pile, the heat is retained for a considerable length of time and, due to this, considerable reversion of the phosphoric acid takes place. Furthermore, when the ammoniated material is stored while hot, it sets up and forms a hard mass difficult to remove from storage due to the crystallization of the various water soluble salts which form solid hard masses during the process of cooling.

The process of the present invention overcomes the aforesaid disadvantages and makes it possible to contact with the phosphate material a predetermined amount of ammonia and to obtain thereby a predetermined and relatively small rise in temperature. The ammoniated material discharged from apparatus employed in accordance with my present process is relatively cool and can be directly deposited on the storage pile without danger of setting up or caking or reversion due to the stored heat in cooling material during subsequent storage.

In the present process prosphate material including superphosphate or double superphosphate is treated with ammonia gas, ammonia liquor or anhydrous liquid ammonia in the presence of previously ammoniated phosphate material. Freshly made acid phosphate, for instance, is mixed with the desired amount of ammoniated acid phosphate, preferably previously cooled, and the mixture is passed through a closed chamber in contact with ammonia.

By properly proportioning materials treated, the rise in temperature due to the heat of reaction may be controlled and undue reversion of available $P_2O_5$ to the unavailable form may be thereby prevented. The proportions of materials may vary from 1 to 3 parts by weight of ammoniated phosphate material to each part of fresh unammoniated phosphate material.

By way of example, if two parts by weight of ammoniated material are mixed with one part by weight of unammoniated material and this mixture brought into contact with ammonia to produce a final product containing about 3% ammonia, the rise in temperature during ammoniation will be about 50° F. If no ammoniated material were present and if the ammoniation were carried up to 3%, there would be a rise in temperature of about 150° F.

A preferred apparatus which may be employed in the present process is shown in the accompanying drawing in which the single figure is an elevational view partly in cross section of the apparatus.

The apparatus employed comprises an ammoniating chamber 1 and a cooler 2 connected by a pipe 3. The ammoniator 1 comprises a stationary cylinder 4 having closed ends 5 and 6 within which is an open-ended, rotatable, inclined cylinder 7. Passing longitudinally through the axis of the cylinder 7 is a hollow shaft 8, the ends of which pass through stuffing boxes 9 and 10 provided in the end walls 5 and 6 respectively of the cylinder 4. The ends of the shaft 8 rest in bearings 11 and 12. The shaft is rotatable by means of a suitable gear mechanism 13 which is operated by a motor 15. The ends of the cylinder 7 are supported on the shaft 8 by means of spokes 16; and the portion of the shaft 8 within the cylinder 7 is provided with perforations or with spray nozzles 17.

The ends of the cylinder 7 are spaced from the end walls 5 and 6. Attached to the end wall 5 is an inclined chute 18, the free end of which projects into the cylinder 7. An inlet pipe 19 is connected to the cylinder 4 and opens into the chamber 1 directly above the chute 18. The pipe 19 is provided with a valve chamber 20 within which is mounted a star feeder valve 21 operable by well known means. The upper end of the pipe 19 is provided with a funnel 22.

Supported above the funnel 22 is a weighing belt conveyor 23 of standard construction provided with a weighing mechanism 24 of standard construction. Above the conveyor 23 is a hopper 25 from which material may be lowered on the conveyor 23, and above the hopper 25 is a conveyor belt 26 for conducting material into the hopper 25.

A tank 27 for liquid ammonia or ammonia liquor is provided with a pipe 28 for conveying the ammonia into the cylinder 7. The pipe 28 provided with a valve 29 conducts the fluid ammonia first through a metering device 30 and then through either or both of two branch pipes 31 and 32 provided with valves 33 and 34, respectively. The branch pipe 31 conducts the ammonia into the charging end of the ammoniator 1 as at 35 through a nozzle or spraying means or through the open end of the pipe 31. The branch pipe 32 conducts the ammonia into the hollow shaft 8.

The pipe 3 for the passage of material from the discharge end of the chamber 1 to the cooler 2 is provided with a star feeder valve 37 operated by means of a belt 38. The lower open end of the pipe 3 is flared and bent as at 39 to direct material toward the entrance into the cooler 2.

The cooler 2 comprises a rotatable cylinder slightly inclined toward its discharge end and is supported by a shaft 40 by means of spokes 41 at both ends. The ends of the shaft 40 are mounted on the bearings 42 and 43. A motor 44 is suitably geared to the cylinder to rotate the latter.

The charging end of the cylinder 2 is enclosed by a conoidal element 45, the smaller end of which is connected to the intake of a suction fan 46. The discharge end of the cylinder 2 is open. A pipe 47 of relatively large diameter, connects the pressure end of the fan with a dust collector 48.

A belt 49 is provided at the discharge end of the cylinder 2 for conveying material to a chute 50 which conducts part of the material to a conveyor 51 which leads to a storage bin, and a part of the material into a bypass 52 to the lower end of a bucket conveyor 53 which conveys the by-passed material upwardly and dumps it into a chute 54 which passes it into the funnel 22. The bucket conveyor is operated by a belt 55 which is driven by a motor 56.

The dust collector 48 is provided with a conical bottom to which is connected a valved outlet 57 to which is connected a pipe 58 for conducting material from the dust collector 48 to the conveyor 51.

The above described apparatus permits of a continuous ammoniation process, and in the operation thereof superphosphate is weighed on the weighing belt 23 and mixed with the desired proportion of ammoniated superphosphate in the funnel 22. The star feeder valve 21 is continuously rotated and the mixture dumped into the rotating cylinder 7 in which it is brought into intimate contact with measured amounts of ammonia which is ejected from the hollow shaft 8 through the nozzles 17. The material gradually passes toward the outlet end of the ammoniator 1 and downwardly into the pipe 3.

The star feeder valve 37 is continuously rotated and feeds the material into the cylinder 2. While the ammoniated product is passing through the rotating cylinder 2 it is brought into intimate contact with air or other inert gas which is drawn through the cylinder 2 by means of the suction fan 46. The air is preferably passed countercurrent to the ammoniated material and in this way the latter is cooled. Any moisture therein or dust therefrom is passed by means of the fan 46 through the pipe 47 to the dust collector 48.

The rate of flow of the materials through the cylinders 7 and 2 may be controlled for practical purposes by the rate of turning these cylinders. The cylinder walls may be provided with well known means such as angle irons, designated by numerals 60 and 61, which assist in moving the material through the cylinders.

The cooled material from the cylinder 2 is conveyed by the belt 49 to the chute 50. Some of this material drops into the bypass 52 and by means of the bucket conveyor 53 it is carried to the funnel 22 to be mixed with fresh superphosphate material. The speed of the bucket conveyor 53 may be so regulated that the amount of ammoniated material dumped into the funnel 22 is approximately proportioned with respect to the amount of unammoniated material weighed on the belt 23, the proportioning depending upon the maximum temperature desired during ammoniation.

Any surplus of ammoniated material from the cylinder 2 is permitted to slide past the offtake 52 and onto the belt 51. The amount of ammoniated material withdrawn from circulation is substantially equal to the amount of unammoniated material which is passed to the funnel 22 by the belt 23.

Dust which is collected in the dust collector 48 is periodically passed through the valve 57 and the pipe 58 onto the belt 51 and is mixed with the ammoniated material which is stored or prepared for shipment. By my process I obtain a cool ammoniated phosphate product which does not set or cake and is remarkably free-flowing. In this respect it is superior to the original unammoniated phosphate material.

The mixture of the two materials is in far better physical condition for treatment than unammoniated phosphate material alone. Mechanical troubles ordinarily experienced in feeding superphosphate material and passing it through a machine of the type described are practically eliminated when mixed with ammoniated superphosphate.

The form of superphosphate or double superphosphate which is particularly desirable in the present process is described in Patent No. 1,947,138, issued February 13, 1934 to Beverly Ober and Edward H. Wight.

In this patent a process is described by which phosphatic fertilizers are prepared in nodular, granular or porous ball form. In this process finely divided phosphate rock and acid are simultaneously charged through a mixing valve into a rotating autoclave and the material is permitted to react with or without pressure while rotating the autoclave.

The reaction is completed in a relatively short time and the superphosphate product is cured and dried. The finished superphosphate material is in a dense relatively hard condition and in the form described above. This material may be screened to remove the fines and the larger globular particles are ground to any desired size. The resulting material is free-flowing and highly reactive toward ammonia.

It has been found that by my process there is a substantial inhibition of reversion. If the superphosphate consists of granules or particles coarser than dust, a certain length of time is required for the ammonia to penetrate to the innermost portions of a granule or particle. The above process permits of proper diffusion and over-ammoniation is prevented. The circulation of ammoniated material from the outlet of the ammoniating chamber to the inlet provides an interval during which ammonia in the outer portions of a particle may be permitted to diffuse to the inner portions. By proper proportioning of ammoniated and unammoniated material the temperature during ammoniation may be closely controlled.

By my process and apparatus a simple means of reducing the moisture content of ammoniated superphosphate is provided. The product obtained therefore is in an improved physical condition and is a more concentrated fertilizer.

I claim as my invention:

1. A process of preparing ammoniated superphosphate to prevent reversion and caking thereof subsequently to its discharge from the ammoniation stage therefor, which comprises contacting superphosphate with ammonia to produce a predetermined percentage of ammoniation, cooling the ammoniated material, mixing the ammoniated material with superphosphate to be ammoniated and in amounts proportioned to the unammoniated superphosphate to limit, by absorption of part of the heat, the rise in temperature due to the heat of reaction in ammoniation to a predetermined maximum amount which will not cause reversion and caking of the newly ammoniated material during storage and cooling subsequently to discharge from the ammoniation stage contacting the mixture with strong ammonia to convert the superphosphate into ammoniated superphosphate in the presence of the previously prepared ammoniated material, and discharging the mixture from the ammoniation stage at said temperature and percentage of ammoniation.

2. A process of preparing ammoniated phosphate fertilizer to prevent reversion and caking thereof subsequently to its discharge from the ammoniation stage therefor, which comprises mixing superphosphate with ammoniated superphosphate to prepare the superphosphate for treatment with strong ammonia and in amounts proportioned to the unammoniated superphosphate to limit, by absorption of part of the heat, the rise in temperature due to the heat of reaction in ammoniation to a predetermined maximum amount which will not cause reversion and caking of the newly ammoniated material during storage and cooling subsequently to discharge from the ammoniation stage, treating the mixture with strong ammonia to ammoniate the superphosphate, withdrawing a portion of the ammoniated material from the bulk of the resulting product and mixing the withdrawn material with superphosphate before further treatment with strong ammonia to obtain additional ammoniated material.

3. A process of preparing ammoniated superphosphate to prevent reversion and caking thereof subsequently to its discharge from the ammoniation stage therefor, which comprises mixing ammoniated superphosphate with superphosphate and in amounts proportioned to the unammoniated superphosphate to limit, by absorption of part of the heat, the rise in temperature due to the heat of reaction in ammoniation to a predetermined maximum amount which will not cause reversion and caking of the newly ammoniated material during storage and cooling subsequently to discharge from the ammoniation stage, contacting the mixture with strong ammonia to ammoniate the superphosphate to a predetermined percentage and removing it from the ammoniation stage at said maximum temperature, cooling the resulting material while removing moisture therefrom, mixing the dried material with additional superphosphate in proportions as aforesaid and contacting the latter formed mixture with strong ammonia to form additional ammoniated superphosphate as aforesaid.

4. A process of preparing ammoniated phosphate fertilizer to prevent reversion and caking thereof subsequently to its discharge from the ammoniation stage therefor, which comprises mixing one to three parts by weight of ammoniated phosphatic material with about one part of superphosphate, contacting the resulting mixture with strong ammonia and ammoniating it to the same percentage as the admixed ammoniated phosphatic material and thereby maintaining the material during the ammoniation below that at which will cause reversion and caking after discharge from the ammoniation stage due to stored heat therein, discharging the same from the ammoniating stage at such temperature, cooling at least a part of the so discharged ammoniated mixture, and mixing the resulting cooled ammoniated material after a time interval for diffusing the ammonia in the particles in proportion as aforesaid with superphosphate to be ammoniated before treating the latter with strong ammonia to form additional ammoniated superphosphate as aforesaid.

5. A process of preparing ammoniated phosphate fertilizer to prevent reversion and caking thereof subsequently to its discharge from the ammoniation stage therefor, which comprises contacting a mixture of ammoniated superphosphate and superphosphate with strong ammonia to ammoniate the unammoniated superphosphate to a predetermined percentage, the ratio of ammoniated superphosphate to unammoniated phosphate being in proportion to maintain the phosphate from rising during the ammoniation above a predetermined temperature below that at which the material would rise as a consequence of ammoniation to the same degree in the absence of the ammoniated phosphate and the ratio of ammoniated to unammoniated phosphate being in the same ratio as the ratio of the difference between number of degrees it is desired to prevent the material from rising and the maximum predetermined temperature desired is to the number of degrees to which it is desired to have the material rise; cooling the resulting product, to a predetermined degree below the temperature obtained by contact of strong ammonia with the mixture; and mixing a portion of the resulting cooled ammoniated material with additional superphosphate before treating with strong ammonia to form additional ammoniated superphosphate as aforesaid.

6. A process of preparing ammoniated phosphate fertilizer to prevent reversion and caking thereof subsequently to its discharge from the ammoniation stage therefor, which comprises continuously preparing a mixture of superphosphate and ammoniated superphosphate, continuously passing the mixture through a chamber while agitating in contact with strong ammonia in that percentage of ammonia which would be required for a predetermined degree of ammoniation of the same quantity of superphosphate in the absence of the admixed ammoniated superphosphate, continuously withdrawing the resulting product from the said chamber at the predetermined degree of ammoniation, continuously cooling and drying the product, and continuously withdrawing a portion of the cooled product and mixing it with the superphosphate being prepared for ammoniation, the ammoniated superphosphate being mixed as aforesaid in proportion to the superphosphate to be ammoniated as to maintain the mixture during ammoniation from rising to a temperature above that degree at which reversion and caking is promoted during cooling and storage of the material after leaving the ammoniation stage.

7. A process of preparing ammoniated phosphate fertilizer to prevent reversion and caking thereof subsequently to its discharge from the ammoniation stage therefor, which comprises continuously preparing a mixture of superphosphate and ammoniated superphosphate, continuously passing the mixture through a chamber while agitating in contact with strong ammonia in that percentage of ammonia which would be required for a predetermined degree of ammoniation of the same quantity of superphosphate in the absence of the admixed ammoniated superphosphate continuously withdrawing the resulting product from the said chamber at the predetermined degree of ammoniation, continuously passing the said product through a second chamber while cooling and drying the said product, continuously withdrawing the cooled product from the said second chamber, continuously passing a portion of the cooled product into admixture with superphosphate being prepared as aforesaid, and mixing dust collected from the air from the said second chamber with the remaining portion of the said cooled product, the ammoniated superphosphate being mixed as aforesaid in proportion to the superphosphate to be ammoniated as to maintain the mixture during ammoniation from rising to a temperature above that degree at which reversion and caking is promoted during cooling and storage of the material after leaving the ammoniation stage.

MARK SHOELD.